US011674881B2

United States Patent
Lin et al.

(10) Patent No.: US 11,674,881 B2
(45) Date of Patent: *Jun. 13, 2023

(54) SUBSAMPLING FLOW CYTOMETRIC EVENT DATA

(71) Applicant: Becton, Dickinson and Company, Franklin Lakes, NJ (US)

(72) Inventors: Jonathan Lin, San Jose, CA (US); Keegan Owsley, Campbell, CA (US); David A. Roberts, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,294

(22) Filed: Jun. 21, 2022

(65) Prior Publication Data

US 2022/0317018 A1 Oct. 6, 2022

Related U.S. Application Data

(63) Continuation of application No. 16/803,164, filed on Feb. 27, 2020, now Pat. No. 11,402,317.

(Continued)

(51) Int. Cl.
*G01N 15/14* (2006.01)
*G06F 18/23* (2023.01)
(Continued)

(52) U.S. Cl.
CPC ..... *G01N 15/1429* (2013.01); *G01N 15/1456* (2013.01); *G01N 15/1459* (2013.01);
(Continued)

(58) Field of Classification Search
CPC ... G01N 2015/1402; G01N 2015/1477; G01N 2015/149; G01N 2015/1006;
(Continued)

(56) References Cited

U.S. PATENT DOCUMENTS 11,402,317 B2 * 8/2022 Lin .................... G01N 15/1456
2010/0070904 A1    3/2010 Zigon et al.
(Continued)

FOREIGN PATENT DOCUMENTS

WO    WO201823176 A1    12/2018
WO    WO2019209977 A1    10/2019
(Continued)

OTHER PUBLICATIONS

Jimenez-Carretero, et al. "Flow Cytometry Data Preparation Guidelines for Improved Automated Phenotypic Analysis", May 15, 2018, The Journal of Immunology, vol. 200, No. 10, pp. 3319-3331.

*Primary Examiner* — Gordon J Stock, Jr.
(74) *Attorney, Agent, or Firm* — Bret E. Field; Bozicevic, Field & Francis LLP

(57) ABSTRACT

Disclosed herein include systems, devices, computer readable media, and methods for subsampling flow cytometric event data. First and second flow cytometric event data can be transformed into a lower-dimensional space, associated with a plurality of bins, and assigned to a first bin and a second bin. Subsampled flow cytometric event data comprising the first flow cytometric event data can be generated. The subsampled flow cytometric event data can comprise the second flow cytometric event data if the first bin and the second bin are different. The subsampled flow cytometric event data may not comprise the second flow cytometric event data if the first bin and the second bin are identical.

20 Claims, 6 Drawing Sheets

Related U.S. Application Data

(60) Provisional application No. 62/836,537, filed on Apr. 19, 2019.

(51) Int. Cl.
  *G06F 18/213* (2023.01)
  *G01N 15/10* (2006.01)

(52) U.S. Cl.
  CPC ............ *G06F 18/213* (2023.01); *G06F 18/23* (2023.01); *G01N 15/1404* (2013.01); *G01N 2015/1006* (2013.01); *G01N 2015/1402* (2013.01); *G01N 2015/149* (2013.01); *G01N 2015/1477* (2013.01); *G01N 2015/1488* (2013.01)

(58) Field of Classification Search
  CPC ........... G01N 15/1456; G01N 15/1404; G01N 15/1429; G01N 15/1459; G06K 9/6218; G06K 9/6232; G06K 9/6261; G06F 18/213; G06F 18/23
  See application file for complete search history.

(56) References Cited

U.S. PATENT DOCUMENTS

| | | |
|---|---|---|
| 2016/0217253 A1 | 7/2016 | Newman et al. |
| 2018/0046755 A1 | 2/2018 | Pe'er et al. |
| 2018/0247195 A1 | 8/2018 | Kumar et al. |
| 2018/0340890 A1 | 11/2018 | Roederer et al. |
| 2022/0082488 A1 | 3/2022 | Jaimes et al. |

FOREIGN PATENT DOCUMENTS

| | | |
|---|---|---|
| WO | WO2020047468 A1 | 3/2020 |
| WO | WO2020081292 A1 | 4/2020 |
| WO | WO2020081582 A1 | 4/2020 |

* cited by examiner

SUBSAMPLING FLOW CYTOMETRIC EVENT DATA

BACKGROUND

Field

This disclosure relates to relates generally to the field of automated particle assessment, and more particularly to sample analysis and particle characterization methods.

Background

Particle analyzers, such as flow cytometers, can enable the characterization of particles on the basis of electro-optical measurements such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components can be simultaneously detected by using spectrally distinct fluorescent dyes to label the different particles or components. Different cell types can be identified by their light scatter characteristics and fluorescence emissions resulting from labeling various cell proteins or other constituents with fluorescent dye-labeled antibodies or other fluorescent probes. The data obtained from an analysis of cells (or other particles) by multi-color flow cytometry are multidimensional, where each cell corresponds to a point in a multidimensional space defined by the parameters measured. Populations of cells or particles can be identified as clusters of points in the data space.

SUMMARY

Disclosed herein systems, devices, computer readable media, and methods for subsampling flow cytometric event data. in some embodiments, a method comprises: under control of a processor: transforming first flow cytometric event data, associated with a first event of a first plurality of events, of a flow cytometric event dataset in a higher-dimensional space to a first transformed flow cytometric event data, associated with the first event, in a first lower-dimensional space. The first event can be associated with a positive subsampling requirement. The first lower-dimensional space can be associated with a first plurality of bins. The first transformed flow cytometric event data can be associated with a first bin of the first plurality of bins. The method can comprise: transforming second flow cytometric event data, associated with a second event of the first plurality of events, of the flow cytometric event dataset in the higher-dimensional space to a second transformed flow cytometric event data, associated with the second event, in the first lower-dimensional space. The second event can be associated with the positive subsampling requirement. The second transformed flow cytometric event data can be associated with a second bin of the first plurality of bins. The method can comprise: determining the first bin associated with the first transformed flow cytometric event data and the second bin associated with the second transformed flow cytometric event data are different. The method can comprise: generating a subsampled flow cytometric event dataset, of the flow cytometric event data, comprising the first flow cytometric event data associated with the first event and the second flow cytometric event data associated with the second event.

In some embodiments, the method can comprise: receiving flow cytometric event data comprising the first flow cytometric event data and the second flow cytometric event data. The method can comprise: determining the first flow cytometric event data of the first event of the first plurality of events is associated with the positive subsampling requirement; and/or determining the second flow cytometric event data of the second event of the first plurality of events is associated with the positive subsampling requirement. The method can comprise: determining the first transformed flow cytometric event data is associated with the first bin of the first plurality of bins; and/or determining the second transformed flow cytometric event data is associated with the second bin of the first plurality of bins. The method can comprise: determining a first descriptor of the first transformed flow cytometric event data based on the first bin of the first plurality of bins; and/or determining a second descriptor of the second transformed flow cytometric event data based on the second bin of the first plurality of bins. The first descriptor of the first transformed flow cytometric event data associated with the first bin can be a first bin number of the first bin of the first plurality of bins, and/or the second descriptor of the second transformed flow cytometric event data associated with the second bin can be a second bin number of the first bin of the first plurality of bins. The first flow cytometric event data can be associated with a first rare cell and/or the second flow cytometric event data can be associated with a second rare cell. The first rare cell and the second rare cells can be cells of different cell types. The method can comprise: adding the first bin, the first descriptor, and/or the first bin number to a memory data structure; and/or adding the second bin, the second descriptor, and/or the second bin number to the memory data structure.

In some embodiments, the method comprises: transforming third flow cytometric event data, associated with a third event of the first plurality of events, of the flow cytometric event dataset in the higher-dimensional space to a third transformed flow cytometric event data, associated with the third event, in the first lower-dimensional space. The third event can be associated with the positive subsampling requirement. The third transformed flow cytometric event data can be associated with a third bin of the first plurality of bins. The method can comprise: determining the third bin associated with the third transformed flow cytometric event data is the first bin associated with the first transformed flow cytometric event data or the second bin associated with the second transformed flow cytometric event data. The third flow cytometric event data may not be in the subsampled flow cytometric event data of the flow cytometric event data. The method can comprise: determining a third descriptor of the third transformed flow cytometric event data based on the third bin of the first plurality of bins. The third descriptor of the third transformed flow cytometric event data associated with the third bin can be a third bin number of the third bin of the first plurality of bins. The method can comprise: determining the third bin, the third descriptor, and/or the third bin number is not in the memory data structure.

In some embodiments, the method comprises: determining fourth flow cytometric event data, associated with a fourth event of the first plurality of events, is associated with a negative subsampling requirement. Said generating can comprise: generating the subsampled flow cytometric event dataset, of the flow cytometric event data, comprising the fourth flow cytometric event data associated with the fourth event. The method can comprise: receiving a plurality of gates defining a plurality of cells of interest, wherein the fourth flow cytometric event data is associated with a cell of interest of the plurality of cells of interest. The fourth flow cytometric event data can be associated with a sorted cell.

In some embodiments, the method comprises: transforming second flow cytometric event data, associated with a second event of a second plurality of events, of the flow cytometric event dataset in the higher-dimensional space to a second transformed flow cytometric event data, associated with the second event of the second plurality of events, in the first lower-dimensional space. The second event of the second plurality of events can be associated with the positive subsampling requirement. The second transformed flow cytometric event data, associated with the second event of the second plurality of events, can be associated with a second bin of the first plurality of bins. The second bin associated with the second transformed flow cytometric event data, associated with the second event of the second plurality of events and the first bin associated with the first transformed flow cytometric event data, associated with the first event of the first plurality of events can be identical. Said generating can comprise: generating the subsampled flow cytometric event dataset, of the flow cytometric event data, comprising the second flow cytometric event data associated with the second event of the second plurality of events. The method can comprise: determining a last event of the first plurality of events is associated with a time parameter or an event number greater than a predetermined threshold. The method can comprise: resetting the memory data structure. The method can comprise: adding the second bin associated with the second transformed flow cytometric event data, associated with the second event of the second plurality of events, to the memory data structure. In some embodiments, the method can comprise: receiving a degree of subsampling parameter. The method can comprise: determining the predetermined threshold based on the degree of subsampling parameter.

In some embodiments, transforming the first flow cytometric event data comprises transforming the first flow cytometric event data using a first dimensionality reduction function. Transforming the second flow cytometric event data can comprise transforming the second flow cytometric event data using the first dimensionality reduction function. The first dimensionality reduction function and/or the second dimensionality reduction function can be a linear dimensionality reduction function. The first dimensionality reduction function and/or the second dimensionality reduction function can be a non-linear dimensionality reduction function. The non-linear dimensionality reduction function can be t-Distributed Stochastic Neighbor Embedding (t-SNE). The method can comprise: receiving first the dimensionality reduction function, or an identification thereof.

In some embodiments, transforming the first flow cytometric event data comprises transforming the first flow cytometric event data to a first transformed flow cytometric: event data, associated with the first event, in a second lower-dimensional space, using a second dimensionality reduction function. The second lower-dimensional space can be associated with a second plurality of bins. The first transformed flow cytometric event data in the second lower-dimensional space can be associated with a first bin of the second plurality of bins. Transforming the second flow cytometric event data can comprise transforming the second flow cytometric event data to a second transformed flow cytometric event data, associated with the second event, in the second lower-dimensional space, using the second dimensionality reduction function. The second transformed flow cytometric event data in the second lower-dimensional space can be associated with a second bin of the second plurality of bins. The first bin of the first plurality of bins can be associated with a first type of cells of interest. The second bin of the second plurality of bins can be associated with a second type of cells of interest. The second bin of the first plurality of bins may not be associated with the first type of cells of interest. The second bin of the first plurality of bins may not be associated with the second type of cells of interest. The first bin of the second plurality of bins may not be associated with the second type of cells of interest. The first bin of the second plurality of bins may not be associated with the first type of cells of interest. A combination of the first bin of the first plurality of bins and the first bin of the second plurality of bins can be associated with a first type of cells of interest. A combination of the second bin of the first plurality of bins and the second bin of the second plurality of bins can be associated with a second type of cells of interest. A combination of the first bin of the first plurality of bins and the second bin of the second plurality of bins may not be associated with the first type of cells of interest and the second type of cells of interest. A combination of the second bin of the first plurality of bins and the first bin of the second plurality of bins may not be associated with the first type of cells of interest and the second type of cells of interest.

In some embodiments, two bins of the first plurality of bins have an identical size. Each bin of the first plurality of bins can have an identical size. Two bins of the first plurality of bins can have different sizes. Two bins of the first plurality of bins can comprise (approximately) an identical number of transformed flow cytometric event data. Each of the first plurality of bins can comprise approximately an identical number of transformed flow cytometric event data. The method can comprise: determining a size of each of the first plurality of bins. The method can comprise: determining the size of each of the first plurality of bins based on a plurality of gates. The method can comprise: determining the size of each of the first plurality of bins based on the transformed flow cytometric event data associated with a plurality of cells of interest.

Disclosed herein includes embodiments of a computing system for subsampling flow cytometric event data. In some embodiments, the computing system can comprise: non-transitory memory configured to store executable instructions; and a processor (e.g., a hardware processor or a virtual processor) in communication with the non-transitory memory, the processor programmed by the executable instructions to: transform first flow cytometric event data, associated with a first event of a first plurality of events, in a higher-dimensional space to a first transformed flow cytometric event data, associated with the first event, of a flow cytometric event dataset in a first lower-dimensional space, wherein the first event is associated with a positive subsampling requirement, wherein the first lower-dimensional space is associated with a first plurality of bins, and wherein the first transformed flow cytometric event data is associated with a first bin of the first plurality of bins. The processor can be programmed by the executable instructions to: transform second flow cytometric event data, associated with a second event of the first plurality of events, of the flow cytometric event dataset in the higher-dimensional space to a second transformed flow cytometric event data, associated with the second event, in the first lower-dimensional space, wherein the second event is associated with the positive subsampling requirement, and wherein the second transformed flow cytometric event data is associated with a second bin of the first plurality of bins. The processor can be programmed by the executable instructions to: determine the first bin associated with the first transformed flow cytometric event data and the second bin associated with the second transformed flow cytometric event data are different. The processor can be programmed by the executable instructions to: generate a subsampled flow cytometric event dataset, of the flow cytometric event data, comprising the first flow cytometric event data associated with the first event and the second flow cytometric event data associated with the second event.

In some embodiments, the processor is programmed by the executable instructions to: receive flow cytometric event data comprising the first flow cytometric event data and the second flow cytometric event data. The processor can be programmed by the executable instructions to: determine the first flow cytometric event data of the first event of the first plurality of events is associated with the positive subsampling requirement. The processor can be programmed by the executable instructions to: determine the second flow cytometric event data of the second event of the first plurality of events is associated with the positive subsampling requirement. The processor can be programmed by the executable instructions to: determine the first transformed flow cytometric event data is associated with the first bin of the first plurality of bins. The processor can be programmed by the executable instructions to: determine the second transformed flow cytometric event data is associated with the second bin of the first plurality of bins.

In some embodiments, the processor is programmed by the executable instructions to: determine a first descriptor of the first transformed flow cytometric event data based on the first bin of the first plurality of bins. The processor can be programmed by the executable instructions to: determine a second descriptor of the second transformed flow cytometric event data based on the second bin of the first plurality of bins. The first descriptor of the first transformed flow cytometric event data associated with the first bin can be a first bin number of the first bin of the first plurality of bins, and/or the second descriptor of the second transformed flow cytometric event data associated with the second bin can be a second bin number of the first bin of the first plurality of bins. The first flow cytometric event data is associated with a first rare cell and/or the second flow cytometric event data can be associated with a second rare cell. The first rare cell and the second rare cells can be cells of different cell types.

In some embodiments, the processor is programmed by the executable instructions to: add the first bin, the first descriptor, and/or the first bin number to a memory data structure; and/or add the second bin, the second descriptor, and/or the second bin number to the memory data structure. In some embodiments, the processor is programmed by the executable instructions to: transform third flow cytometric event data, associated with a third event of the first plurality of events, of the flow cytometric event dataset in the higher-dimensional space to a third transformed flow cytometric event data, associated with the third event, in the first lower-dimensional space. The third event can be associated with the positive subsampling requirement. The third transformed flow cytometric event data can be associated with a third bin of the first plurality of bins. The processor can be programmed by the executable instructions to: determine the third bin associated with the third transformed flow cytometric event data is the first bin associated with the first transformed flow cytometric event data or the second bin associated with the second transformed flow cytometric event data. The third flow cytometric event data may not be in the subsampled flow cytometric event data of the flow cytometric event data. The processor can be programmed by the executable instructions to: determine a third descriptor of the third transformed flow cytometric event data based on the third bin of the first plurality of bins. The third descriptor of the third transformed flow cytometric event data associated with the third bin can be a third bin number of the third bin of the first plurality of bins. The processor can be programmed by the executable instructions to: determine the third bin, the third descriptor, and/or the third bin number is not in the memory data structure.

In some embodiments, the processor is programmed by the executable instructions to: determine fourth flow cytometric event data, associated with a fourth event of the first plurality of events, is associated with a negative subsampling requirement. To generate the subsampled flow cytometric event dataset, the processor can be programmed by the executable instructions to: generate the subsampled flow cytometric event dataset, of the flow cytometric event data, comprising the fourth flow cytometric event data associated with the fourth event. The processor can be programmed by the executable instructions to: receive a plurality of gates defining a plurality of cells of interest. The fourth flow cytometric event data can be associated with a cell of interest of the plurality of cells of interest. The fourth flow cytometric event data can be associated with a sorted cell.

In some embodiments, the processor is programmed by the executable instructions to: transform second flow cytometric event data, associated with a second event of a second plurality of events, of the flow cytometric event dataset in the higher-dimensional space to a second transformed flow cytometric event data, associated with the second event of the second plurality of events, in the first lower-dimensional space. The second event of the second plurality of events can be associated with the positive subsampling requirement. The second transformed flow cytometric event data, associated with the second event of the second plurality of events, can be associated with a second bin of the first plurality of bins. The second bin associated with the second transformed flow cytometric event data, associated with the second event of the second plurality of events and the first bin associated with the first transformed flow cytometric event data, associated with the first event of the first plurality of events can be identical. To generate the subsampled flow cytometric event dataset, the processor can be programmed by the executable instructions to: generate the subsampled flow cytometric event dataset, of the flow cytometric event data, comprising the second flow cytometric event data associated with the second event of the second plurality of events. The processor can be programmed by the executable instructions to: determine a last event of the first plurality of events is associated with a time parameter or an event number greater than a predetermined threshold. The processor can be programmed by the executable instructions to: reset the memory data structure. The processor can be programmed by the executable instructions to: add the second bin associated with the second transformed flow cytometric event data, associated with the second event of the second plurality of events, to the memory data structure.

In some embodiments, the processor is programmed by the executable instructions to: receive a degree of subsampling parameter. The processor can be programmed by the executable instructions to: determine the predetermined threshold based on the degree of subsampling parameter.

In some embodiments, to transform the first flow cytometric event data, the processor can be programmed by the executable instructions to: transform the first flow cytometric event data using a first dimensionality reduction function, and/or to transform the second flow cytometric event data, the processor can be programmed by the executable instructions to: transform the second flow cytometric event data using the first dimensionality reduction function. The first dimensionality reduction function and/or the second dimensionality reduction function can be a linear dimensionality reduction function. The first dimensionality reduction function and/or the second dimensionality reduction function can be a non-linear dimensionality reduction function. The non-linear dimensionality reduction function can be t-Distributed. Stochastic Neighbor Embedding (t-SNE). The processor can be programmed by the executable instructions to: receive first the dimensionality reduction function, or an identification thereof.

In some embodiments, to transform the first flow cytometric event data, the processor is programmed by the executable instructions to: transform the first flow cytometric event data to a first transformed flow cytometric event data, associated with the first event, in a second lower-dimensional space, using a second dimensionality reduction function. The second lower-dimensional space can be associated with a second plurality of bins. The first transformed flow cytometric event data in the second lower-dimensional space can be associated with a first bin of the second plurality of bins. To transform the second flow cytometric event data, the processor can be programmed by the executable instructions to: transform the second flow cytometric event data to a second transformed flow cytometric event data, associated with the second event, in the second lower-dimensional space, using the second dimensionality reduction function. The second transformed flow cytometric event data in the second lower-dimensional space can be associated with a second bin of the second plurality of bins. The first bin of the first plurality of bins can be associated with a first type of cells of interest, the second bin of the second plurality of bins can be associated with a second type of cells of interest, the second bin of the first plurality of bins may not be associated with the first type of cells of interest, the second bin of the first plurality of bins may not be associated with the second type of cells of interest, the first bin of the second plurality of bins may not be associated with the second type of cells of interest, and/or the first bin of the second plurality of bins may not be associated with the first type of cells of interest. A combination of the first bin of the first plurality of bins and the first bin of the second plurality of bins can be associated with a first type of cells of interest, and/or a combination of the second bin of the first plurality of bins and the second bin of the second plurality of bins can be associated with a second type of cells of interest. A combination of the first bin of the first plurality of bins and the second bin of the second plurality of bins is not associated with the first type of cells of interest and the second type of cells of interest, and/or a combination of the second bin of the first plurality of bins and the first bin of the second plurality of bins is not associated with the first type of cells of interest and the second type of cells of interest.

In some embodiments, two bins of the first plurality of bins have an identical size. Each bin of the first plurality of bins can have an identical size. Two bins of the first plurality of bins can have different sizes. Two bins of the first plurality of bins can comprise approximately an identical number of transformed flow cytometric event data. Each of the first plurality of bins can comprise approximately an identical number of transformed flow cytometric event data. The processor can be programmed by the executable instructions to: determine a size of each of the first plurality of bins. The processor can be programmed by the executable instructions to: determine the size of each of the first plurality of bins based on a plurality of gates. The processor can be programmed by the executable instructions to: determine the size of each of the first plurality of bins based on the transformed flow cytometric event data associated with a plurality of cells of interest.

DETAILED DESCRIPTION

Figure 1:
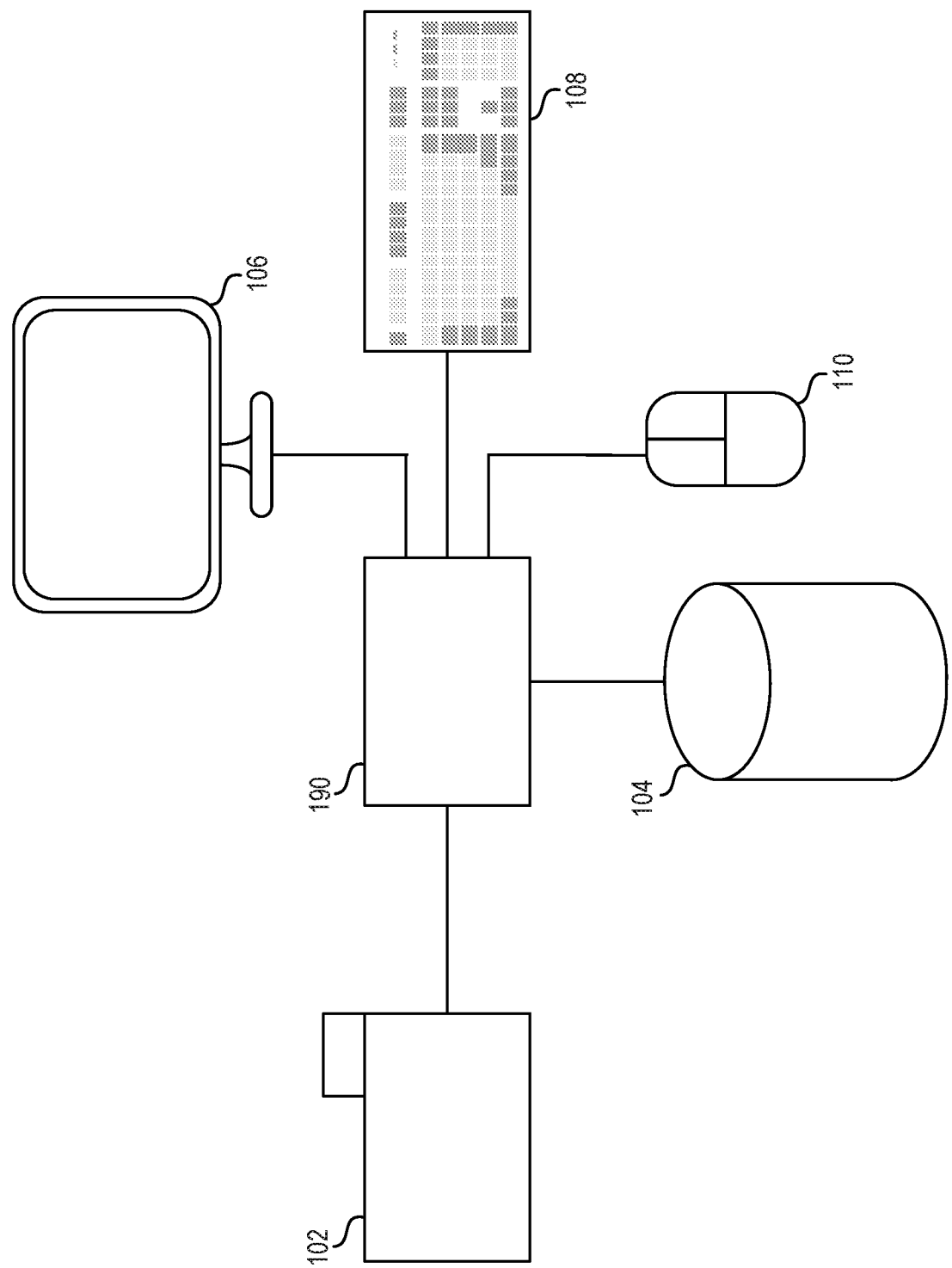
FIG. 1 shows a functional block diagram for one example of a sorting control system for analyzing and displaying biological events.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

Particle analyzers, such as flow and scanning cytometers, are analytical tools that enable the characterization of particles on the basis of electro-optical measurements such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components can be simultaneously detected by using spectrally distinct fluorescent dyes to label the different particles or components. In some implementations, a multiplicity of photodetectors, one for each of the scatter parameters to be measured, and one or more for each of the distinct dyes to be detected are included in the analyzer. For example, some embodiments include spectral configurations where more than one sensor or detector is used per dye. The data obtained comprise the signals measured for each of the light scatter detectors and the fluorescence emissions.

Particle analyzers can further comprise means for recording the measured data and analyzing the data. For example, data storage and analysis can be carried out using a computer connected to the detection electronics. For example, the data can be stored in tabular form, where each row corresponds to data for one particle, and the columns correspond to each of the measured features. The use of standard file formats, such as a Flow Cytometry Standard ("FCS") file format, for storing data from a particle analyzer facilitates analyzing data using separate programs and/or machines. Using current analysis methods, the data typically are displayed in 1-dimensional histograms or 2-dimensional (2D) plots for ease of visualization, but other methods can be used to visualize multidimensional data.

The parameters measured using, for example, a flow cytometer typically include light scattered by the particle in a narrow angle along a mostly forward direction (referred to as forward scatter (FSC)), light that is scattered by the particle in an orthogonal direction to the excitation laser (referred to as side scatter (SSC)), and the light emitted from fluorescent molecules in one or more detectors that measure signal over a range of spectral wavelengths, or by the fluorescent dye that is primarily detected in that specific detector or array of detectors. Different cell types can be identified by their light scatter characteristics and fluorescence emissions resulting from labeling various cell proteins or other constituents with fluorescent dye-labeled antibodies or other fluorescent probes.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); each of which is incorporated herein by reference. Fluorescence imaging microscopy is described in, for example, Pawley (ed.), Handbook of Biological Confocal Microscopy, 2nd Edition, Plenum Press (1989), incorporated herein by reference.

The data obtained from an analysis of cells (or other particles) by multi-color flow cytometry are multidimensional, where each cell corresponds to a point in a multidimensional space defined by the parameters measured. Populations of cells or particles can be identified as clusters of points in the data space. The identification of clusters and, thereby, populations can be carried out manually by drawing a gate around a population displayed in one or more 2-dimensional plots, referred to as "scatter plots" or "dot plots," of the data. Alternatively, clusters can be identified, and gates that define the limits of the populations, can be determined automatically. Examples of methods for automated gating have been described in, for example, U.S. Pat. Nos. 4,845,653; 5,627,040; 5,739,000; 5,795,727; 5,962,238; 6,014,904; 6,944,338; and 8,990,047; each of which is incorporated herein by reference.

Flow cytometry is a valuable method for the analysis and isolation of biological particles such as cells and constituent molecules. As such it has a wide range of diagnostic and therapeutic applications. The method utilizes a fluid stream to linearly segregate particles such that they can pass, single file, through a detection apparatus. Individual cells can be distinguished according to their location in the fluid stream and the presence of detectable markers. Thus, a flow cytometer can be used to characterize and produce a diagnostic profile of a population of biological particles.

Isolation of biological particles has been achieved by adding a sorting or collection capability to flow cytometers. Particles in a segregated stream, detected as having one or more desired characteristics, can be individually isolated from the sample stream by mechanical or electrical separation. This method of flow sorting has been used to sort cells of different types, to separate sperm bearing X and Y chromosomes for animal breeding, to sort chromosomes for genetic analysis, and to isolate particular organisms from complex biological population.

Gating can be used to classify and help make sense of the large quantity of data that can be generated from a sample. Given the large quantities of data presented for a given sample, there exists a need to efficiently control the graphical display of the data.

Fluorescence-activated particle sorting or cell sorting is a specialized type of flow cytometry. Fluorescence-activated particle sorting or cell sorting provides a method for sorting a heterogeneous mixture of particles into one or more containers, one cell at a time, based upon the specific light scattering and fluorescent characteristics of each cell. It records fluorescent signals from individual cells, and physically separates cells of particular interest. The acronym FACS is trademarked and owned by Becton, Dickinson and Company (Franklin Lakes, N.J.) and can be used to refer to devices for performing fluorescence-activated particle sorting or cell sorting.

The particle suspension is placed near the center of a narrow, rapidly flowing stream of liquid. The flow is arranged so that on the average there is a large separation between particles relative to their diameter as they arrive stochastically (e.g., a Poisson process) into the detection region. A vibrating mechanism can cause the emerging fluid stream to break off in a stable manner into individual droplets that contain particles previously characterized in the detection region. The system can generally be adjusted so that there is a low probability of more than one particle being in a droplet. If a particle is classified to be collected, a charge can be applied to the flow cell and emerging stream during the period of time one or more drops form and break off from the stream. These charged droplets then move through an electrostatic deflection system that diverts droplets into target containers based upon the charge applied to the droplet.

A sample can include thousands if not millions of cells. Cells can be sorted to purify a sample to the cells of interest. The sorting process can generally identify three varieties of cells: cells of interest, cells which are not of interest, and cells which cannot be identified. In order to sort cells with high purity (e.g., high concentration of cells of interest), droplet generating cell sorters can abort the sort electronically if the desired cells are too close to another unwanted cell and thereby reduce contamination of the sorted populations by any inadvertent inclusion of an unwanted particle within the droplet containing the particle of interest.

Disclosed herein systems, devices, computer readable media, and methods for subsampling flow cytometric event data. In some embodiments, a method comprises: under control of a processor: transforming first flow cytometric event data, associated with a first event of a first plurality of events, in a higher-dimensional space to a first transformed flow cytometric event data, associated with the first event, in a first lower-dimensional space. The first event can be associated with a positive subsampling requirement. The first lower-dimensional space cam be associated with a first plurality of bins. The first transformed flow cytometric event data can be associated with a first bin of the first plurality of bins. The method can comprise: transforming second flow cytometric event data, associated with a second event of the first plurality of events, in the higher-dimensional space to a second transformed flow cytometric event data, associated with the second event, in the first lower-dimensional space. The second event can be associated with the positive subsampling requirement. The second transformed flow cytometric event data can be associated with a second bin of the first plurality of bins. The method can comprise: determining the first bin associated with the first transformed flow cytometric event data and the second bin associated with the second transformed flow cytometric event data are different. The method can comprise: generating the subsampled flow cytometric event dataset, of the flow cytometric event data, comprising the first flow cytometric event data associated with the first event and the second flow cytometric event data associated with the second event.

Disclosed herein includes embodiments of a computing system for subsampling flow cytometric event data. In some embodiments, the computing system can comprise: non-transitory memory configured to store executable instructions; and a processor (e.g., a hardware processor or a virtual processor) in communication with the non-transitory memory, the processor programmed by the executable instructions to: transform first flow cytometric event data, associated with a first event of a first plurality of events, in a higher-dimensional space to a first transformed flow cytometric event data, associated with the first event, of a flow cytometric event dataset in a first lower-dimensional space, wherein the first event is associated with a positive subsampling requirement, wherein the first lower-dimensional space is associated with a first plurality of bins, and wherein the first transformed flow cytometric event data is associated with a first bin of the first plurality of bins. The processor can be programmed by the executable instructions to: transform second flow cytometric event data, associated with a second event of the first plurality of events, of the flow cytometric event dataset in the higher-dimensional space to a second transformed flow cytometric event data, associated with the second event, in the first lower-dimensional space, wherein the second event is associated with the positive subsampling requirement, and wherein the second transformed flow cytometric event data is associated with a second bin of the first plurality of bins. The processor can be programmed by the executable instructions to: determine the first bin associated with the first transformed flow cytometric event data and the second bin associated with the second transformed flow cytometric event data are different. The processor can be programmed by the executable instructions to: generate the subsampled flow cytometric event dataset, of the flow cytometric event data, comprising the first flow cytometric event data associated with the first event and the second flow cytometric event data associated with the second event.

Definitions

As used herein, the terms set forth with particularity below have the following definitions. If not otherwise defined in this section, all terms used herein have the meaning commonly understood by a person skilled in the arts to which this invention belongs.

As used herein, "system," "instrument," "apparatus," and "device" generally encompass both the hardware (e.g., mechanical and electronic) and, in some implementations, associated software specialized computer programs for graphics control) components.

As used herein, an "event" or "event data" generally refers to the data (e.g., assembled packet of data) measured from a single particle, such as cells or synthetic particles. Typically, the data measured from a single particle include a number of parameters or features, including one or more light scattering parameters or features, and at least one other parameter or feature derived from fluorescence detected from the particle such as the intensity of the fluorescence. Thus, each event can be represented as a vector of parameter and feature measurements, wherein each measured parameter or feature corresponds to one dimension of the data space. In some embodiments, the data measured from a single particle include image, electric, temporal, or acoustic data. An event can be associated with an experiment, an assay, or a sample source which can he identified in association with the measurement data.

As used herein, a "population", or "subpopulation" of particles, such as cells or other particles, generally refers to a group of particles that possess properties (for example, optical, impedance, or temporal properties) with respect to one or more measured parameters such that measured parameter data form a cluster in the data space. Thus, populations can be recognized as clusters in the data. Conversely, each data cluster generally is interpreted as corresponding to a population of a particular type of cell or particle, although clusters that correspond to noise or background typically also are observed. A cluster can be defined in a subset of the dimensions, e.g., with respect to a subset of the measured parameters, which corresponds to populations that differ in only a subset of the measured parameters or features extracted from the measurements of the cell or particle.

As used herein, a "gate" generally refers to a classifier boundary identifying a subset of data of interest. In cytometry, a gate can bound a group of events of particular interest. As used herein, "gating" generally refers to the process of classifying the data using a defined gate for a given set of data, where the gate can be one or more regions of interest combined with Boolean logic.

Specific examples of various embodiments and systems in which they are implemented are described further below.

Sorting Control System

FIG. 1 shows a functional block diagram for one example of a sorting control system, such as an analytics controller 100, for analyzing and displaying biological events. An analytics controller 100 can be configured to implement a variety of processes for controlling graphic display of biological events.

A particle analyzer or sorting system 102 can be configured to acquire biological event data. For example, a flow cytometer can generate flow cytometric event data. The particle analyzer 102 can be configured to provide biological event data to the analytics controller 100. A data communication channel can be included between the particle analyzer 102 and the analytics controller 100. The biological event data can be provided to the analytics controller 100 via the data communication channel.

The analytics controller 100 can be configured to receive biological event data from the particle analyzer 102. The biological event data received from the particle analyzer 102 can include flow cytometric event data. The analytics controller 100 can be configured to provide a graphical display including a first plot of biological event data to a display device 106. The analytics controller 100 can be further configured to render a region of interest as a gate around a population of biological event data shown by the display device 106, overlaid upon the first plot, for example. In some embodiments, the gate can be a logical combination of one or more graphical regions of interest drawn upon a single parameter histogram or bivariate plot.

The analytics controller 100 can be further configured to display the biological event data on the display device 106 within the gate differently from other events in the biological event data outside of the gate. For example, the analytics controller 100 can be configured to render the color of biological event data contained within the gate to be distinct from the color of biological event data outside of the gate. The display device 106 can be implemented as a monitor, a tablet computer, a smartphone, or other electronic device configured to present graphical interfaces.

The analytics controller 100 can be configured to receive a gate selection signal identifying the gate from a first input device. For example, the first input device can be implemented as a mouse 110. The mouse 110 can initiate a gate selection signal to the analytics controller 100 identifying the gate to be displayed on or manipulated via the display device 106 (e.g., by clicking on or in the desired gate when the cursor is positioned there). In some implementations, the first device can be implemented as the keyboard 108 or other means for providing an input signal to the analytics controller 100 such as a touchscreen, a stylus, an optical detector, or a voice recognition system. Some input devices can include multiple inputting functions. In such implementations, the inputting functions can each he considered an input device. For example, as shown in FIG. 1, the mouse 110 can include a right mouse button and a left mouse button, each of which can generate a triggering event.

The triggering event can cause the analytics controller 100 to alter the manner in which the data is displayed, which portions of the data is actually displayed on the display device 106, and/or provide input to further processing such as selection of a population of interest for particle sorting.

In some embodiments, the analytics controller 100 can be configured to detect when gate selection is initiated by the mouse 110. The analytics controller 100 can be further configured to automatically modify plot visualization to facilitate the gating process. The modification can he based on the specific distribution of biological event data received by the analytics controller 100.

The analytics controller 100 can be connected to a storage device 104. The storage device 104 can be configured to receive and store biological event data from the analytics controller 100. The storage device 104 can also be configured to receive and store flow cytometric event data from the analytics controller 100. The storage device 104 can be further configured to allow retrieval of biological event data, such as flow cytometric event data, by the analytics controller 100.

A display device 106 can be configured to receive display data from the analytics controller 100. The display data can comprise plots of biological event data and gates outlining sections of the plots. The display device 106 can be further configured to alter the information presented according to input received from the analytics controller 100 in conjunction with input from the particle analyzer 102, the storage device 104, the keyboard 108, and/or the mouse 110.

In some implementations the analytics controller 100 can generate a user interface to receive example events for sorting. For example, the user interface can include a control for receiving example events or example images. The example events or images or an example gate can be provided prior to collection of event data for a sample, or based on an initial set of events for a portion of the sample.

Particle Sorter System

A common flow sorting technique can be referred to as "electrostatic cell sorting," utilizes droplet sorting in which a stream or moving fluid column containing linearly segregated particles is broken into drops and the drops containing particles of interest are electrically charged and deflected into a collection tube by passage through an electric field. Droplet sorting systems are capable of forming drops at a rate of 100,000 drops/second in a fluid stream that is passed through a nozzle having a diameter less than 100 micrometers. Droplet sorting typically requires that the drops break off from the stream at a fixed distance from the nozzle tip. The distance is normally on the order of a few millimeters from the nozzle tip and can be stabilized and maintained for an unperturbed fluid stream by oscillating the nozzle tip at a predefined frequency with an amplitude to hold the break-off constant. For example, in some embodiments, adjusting amplitude of a sine wave shaped voltage pulse at a given frequency holds the break-off stable and constant.

Typically, the linearly entrained particles in the stream are characterized as they pass through an observation point situated within a flow cell or cuvette, or just below the nozzle tip. Once a particle is identified as meeting one or more desired criteria, the time at which it will reach the drop break-off point and break from the stream in a drop can be predicted. Ideally, a brief charge is applied to the fluid stream just before the drop containing the selected particle breaks from the stream and then grounded immediately after the drop breaks off. The drop to be sorted maintains an electrical charge as it breaks off from the fluid stream, and all other drops are left uncharged. The charged drop is deflected sideways from the downward trajectory of the other drops by an electrical field and collected in a sample tube. The uncharged drops fall directly into a drain.

Figure 2A:
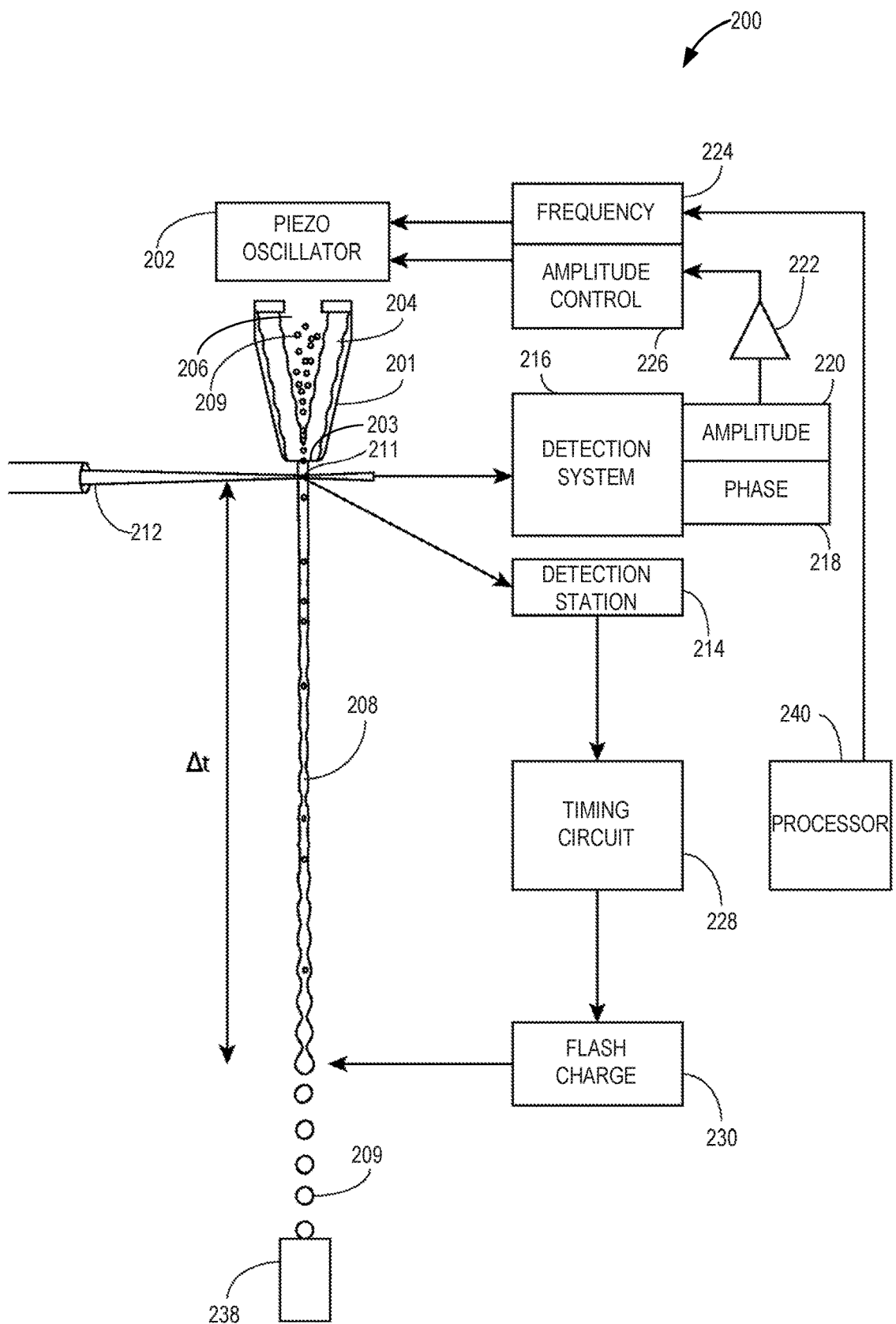
FIG. 2A is a schematic drawing of a particle sorter system, in accordance with one embodiment presented herein

FIG. 2A is a schematic drawing of a particle sorter system 200 (e.g., the particle analyzer 102) in accordance with one embodiment presented herein. In some embodiments, the particle sorter system 200 is a cell sorter system. As shown in FIG. 2A, a drop formation transducer 202 (e.g., piezo-oscillator) is coupled to a fluid conduit 201, which can be coupled to, can include, or can be, a nozzle 203. Within the fluid conduit 201, sheath fluid 204 hydrodynamically focuses a sample fluid 206 comprising particles 209 into a moving fluid column 208 (e.g. a stream). Within the moving fluid column 208, particles 209 cells) are lined up in single file to cross a monitored area 211 (e.g., where laser-stream intersect), irradiated by an irradiation source 212 (e.g., a laser). Vibration of the drop formation transducer 202 causes moving fluid column 208 to break into a plurality of drops 210, some of which contain particles 209.

In operation, a detection station 214 (e.g., an event detector) identifies when a particle of interest (or cell of interest) crosses the monitored area 211. Detection station 214 feeds into a timing circuit 228, which in turn feeds into a flash charge circuit 230. At a drop break off point, informed by a timed drop delay (Δt), a flash charge can be applied to the moving fluid column 208 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 2A, the drops can be collected in a drain receptacle 238.

A detection system 216 (e.g. a drop boundary detector) serves to automatically determine the phase of a drop drive signal when a particle of interest passes the monitored area 211. An exemplary drop boundary detector is described in U.S. Pat. No. 7,679,039, which is incorporated herein by reference in its entirety. The detection system 216 allows the instrument to accurately calculate the place of each detected particle in a drop. The detection system 216 can feed into an amplitude signal 220 and/or phase 218 signal, which in turn feeds (via amplifier 222) into an amplitude control circuit 226 and/or frequency control circuit 224. The amplitude control circuit 226 and/or frequency control circuit 224, in turn, controls the drop formation transducer 202. The amplitude control circuit 226 and/or frequency control circuit 224 can be included in a control system.

In some implementations, sort electronics (e.g., the detection system 216, the detection station 214 and a processor 240) can be coupled with a memory configured to store the detected events and a sort decision based thereon. The sort decision can be included in the event data for a particle. In some implementations, the detection system 216 and the detection station 214 can be implemented as a single detection unit or communicatively coupled such that an event measurement can be collected by one of the detection system 216 or the detection station 214 and provided to the non-collecting element.

Figure 2B:
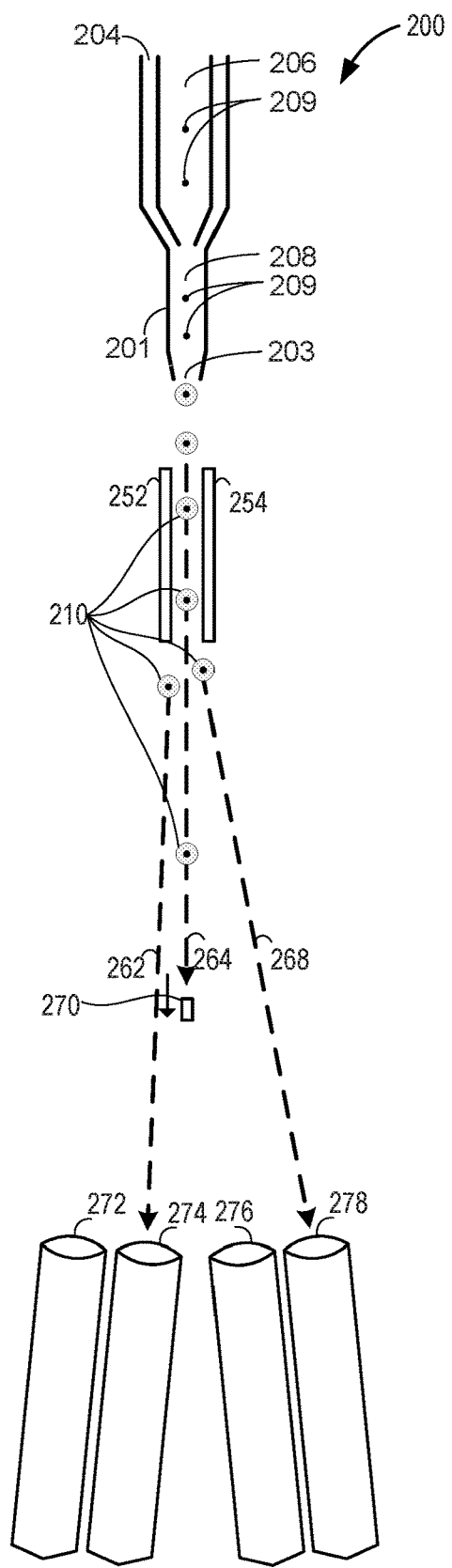
FIG. 2B is a schematic drawing of another particle sorter system, in accordance with one embodiment presented herein.

FIG. 2B is a schematic drawing of a particle sorter system, in accordance with one embodiment presented herein. The particle sorter system 200 shown in FIG. 2B, includes deflection plates 252 and 254. A charge can be applied via a stream-charging wire in a barb. This creates a stream of droplets 210 containing particles 210 for analysis. The particles can be illuminated with one or more light sources (e.g., lasers) to generate light scatter and fluorescence information. The information for a particle is analyzed such as by sorting electronics or other detection system (not shown in FIG. 2B). The deflection plates 252 and 254 can be independently controlled to attract or repel the charged droplet to guide the droplet toward a destination collection receptacle (e.g., one of 272, 274, 276, or 278). As shown in FIG. 2B, the deflection plates 252 and 254 can be controlled to direct a particle along a first path 262 toward the receptacle 274 or along a second path 268 toward the receptacle 278. If the particle is not of interest (e.g., does not exhibit scatter or illumination information within a specified sort range), deflection plates may allow the particle to continue along a flow path 264. Such uncharged droplets may pass into a waste receptacle such as via aspirator 270.

The sorting electronics can be included to initiate collection of measurements, receive fluorescence signals for particles, and determine how to adjust the deflection plates to cause sorting of the particles. Example implementations of the embodiment shown in FIG. 2B include the BD FACS Aria™ line of flow cytometers commercially provided by Becton, Dickinson and Company (Franklin Lakes, N.J.).

In some embodiments, one or more components described for the particle sorter system 200 can be used to analyze and characterize particles, with or without physically sorting the particles into collection vessels. Likewise, one or more components described below for the particle analysis system 300 (FIG. 3) can be used to analyze and characterize particles, with or without physically sorting the particles into collection vessels. For example, particles can be grouped or displayed in a tree that includes at least three groups as described herein, using one or more of the components of the particle sorter system 200 or particle analysis system 300.

Figure 3:
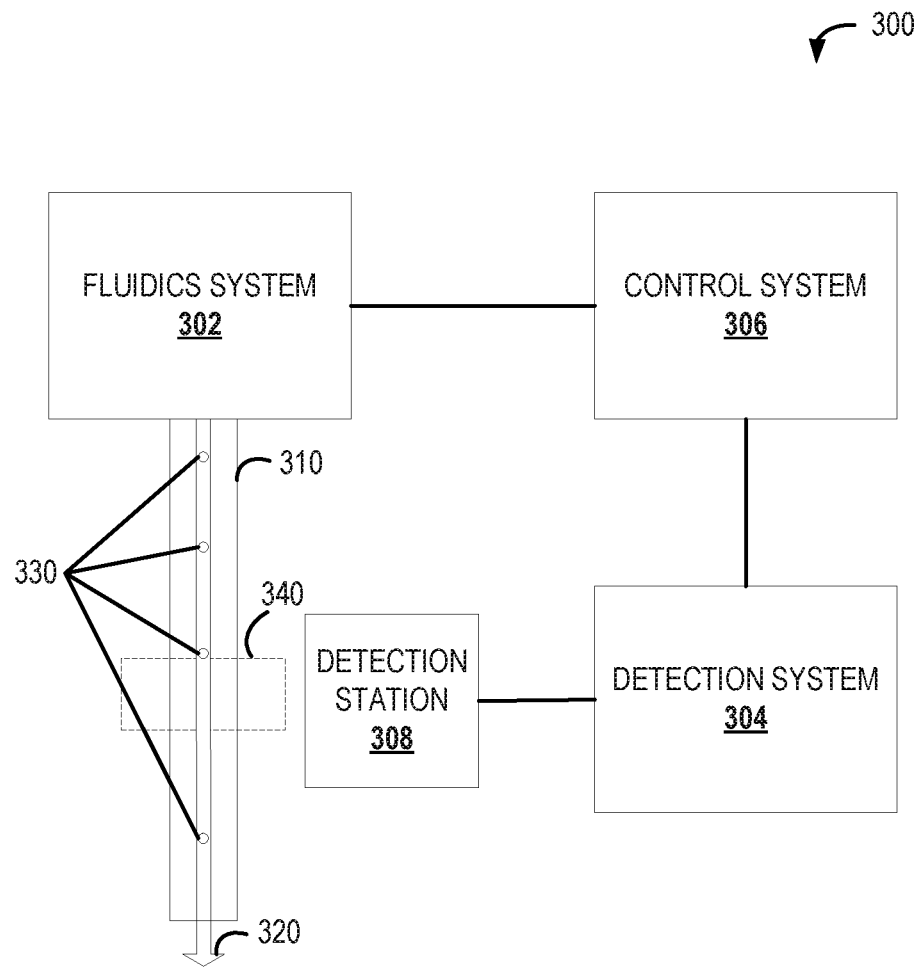
FIG. 3 shows a functional block diagram of a particle analysis system for computational based sample analysis and particle characterization.

FIG. 3 shows a functional block diagram of a particle analysis system for computational based sample analysis and particle characterization. In some embodiments, the particle analysis system 300 is a flow system. The particle analysis system 300 shown in FIG. 3 can be configured to perform, in whole or in part, the methods described herein such as. The particle analysis system 300 includes a fluidics system 302. The fluidics system 302 can include or be coupled with a sample tube 310 and a moving fluid column within the sample tube in which particles 330 (e.g. cells) of a sample move along a common sample path 320.

The particle analysis system 300 includes a detection system 304 configured to collect a signal from each particle as it passes one or more detection stations along the common sample path. A detection station 308 generally refers to a monitored area 340 of the common sample path. Detection can, in some implementations, include detecting light or one or more other properties of the particles 330 as they pass through a monitored area 340. In FIG. 3, one detection station 308 with one monitored area 340 is shown. Some implementations of the particle analysis system 300 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 304 is configured to collect a succession of such data points in a first time interval.

The particle analysis system 300 can also include a control system 306. The control system 306 can include one or more processors, an amplitude control circuit 226 and/or a frequency control circuit 224 as shown in FIG. 2B. The control system 206 shown can be operationally associated with the fluidics system 302. The control system 206 can be configured to generate a calculated signal frequency for at least a portion of the first time interval based on a Poisson distribution and the number of data points collected by the detection system 304 during the first time interval. The control system 306 can be further configured to generate an experimental signal frequency based on the number of data points in the portion of the first time interval. The control system 306 can additionally compare the experimental signal frequency with that of a calculated signal frequency or a predetermined signal frequency.

Subsampling Flow Cytometric Event Data

Disclosed herein include systems, devices, computer readable media, and methods for subsampling datasets (e.g., large, high-dimensional datasets) that enable weighing rare events and populations such that the rare events and populations are adequately represented in the resulting subset. In some embodiments, a subset of a dataset that preserves all populations (e.g., all populations, including rare cells and populations, can be represented in the subset of the dataset or subsampled dataset) when saving the entire dataset is not desirable. In some embodiments, the subsets or subsampled datasets preserve representative samples from rare subpopulations. In some embodiments, a dataset can be subsampled without discarding rare events or events of interest (e.g., corresponding to rare cells or cells of interest). The system automatically detects rare events and saves them while more aggressively discarding common events.

In some embodiments, data can be subsampled non-randomly (e.g., semi-randomly). A desired subsampling rate can be selected and then the data is fed through a subsample method sequentially. The method can decide to save or discard events (or multidimensional event data associated with events) on a single event basis. The ability to discard events without analyzing the overall distribution of events removes the need for saving and analyzing large amounts of data.

A user can select a degree of subsampling parameter. The degree of subsampling parameter can determine the duration of the algorithms "memory."

The user can select one or more transformations or "fingerprinting" functions. A transformation or fingerprinting function can be a mathematical equation that transforms the data in some way, such as from a higher dimensional space to a lower dimensional space. For example, a transformation or fingerprinting function can be t-Distributed Stochastic Neighbor Embedding (t-SNE). An event can be transformed into a lower dimensional space that is divided into bins. The bin number can serve as a descriptor of the event.

In some embodiments, binning can be uniform or can be based on event density. Binning can be based on automated population detection. Binning can be partially based on arbitrarily drawn gates (e.g., drawn by the user). In some embodiments, a transformation or fingerprinting function can transform events such that similar events have the same identifier. Identifiers can be smaller than the data used to generate the identifiers. The transformation can be computationally cheap to compute. An inverse of the transformation or function may or may not exist. In some embodiments, multiple fingerprinting functions can be used. For example, different target populations can be defined using different fingerprinting functions. As another example, target populations can be defined based on the combined output of multiple fingerprinting functions.

Third, the user can describe events that should not be sub-sampled. For example, gates around regions of interest can be drawn automatically or by the user. Events within the gates around regions of interest may not be subsampled. As another example, any event that is sorted (e.g., a cell that is not sorted) may not be subsampled.

The event data can be subsampled using the subsampling method disclosed herein. For example, for each event:
i. Check if the event should be sub-sampled. Save the event if the answer is no.
ii. If the event should be subsampled, generate a descriptor using the fingerprinting function.
  1. Compare descriptor to algorithm "memory". Has this descriptor been seen before?
    a. Yes. Discard event
    b. No. Save event and save descriptor in memory.
iii. Check time or event number. If the time and/or an event number surpasses a corresponding threshold value generated by the user's degree of subsampling parameter, reset the algorithm memory.

The subsampling method disclosed herein, a non-random subsampling method, can be complement or supplement random subsampling used to subsample large datasets. Rare populations may be eliminated when randomly sampling data. The subsampling method may include some, a majority, or all of rare populations. For particle analyses such as flow cytometric analyses, rare events can potentially be very valuable. Preserving rare populations can be useful so that rare populations are detected when the reduced dataset is analyzed. The non-random subsampling method can intentionally biases the randomly sampling process such that are populations are much more likely o be represented in the final subsampled dataset.

Naïve segmentation of the data space without dimensionality reduction may result in bins that are sparsely populated with data due to the so-called "curse of dimensionality." The dimensionality reduction transformation or function used can be a relationship-preserving embedding, which allows for binning in lower dimensional space and allows for more efficient grouping of data prior to subsampling.

Subsampling Particle Analysis Event Data Method

Figure 4:
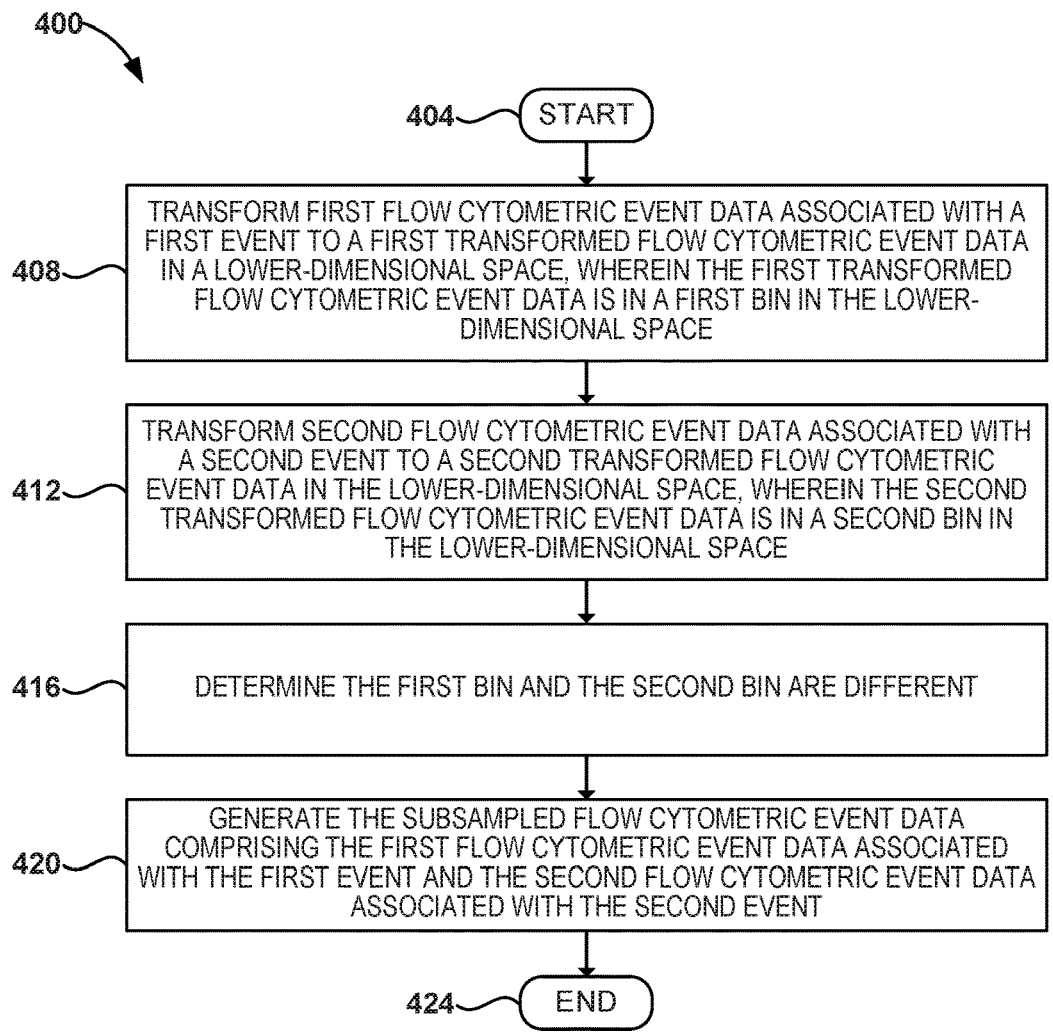
FIG. 4 is a flow diagram showing an exemplary method subsampling flow cytometric event data.

FIG. 4 is a flow diagram showing an exemplary method 400 of subsampling particle analysis event data, such as flow cytometric event data. The method 400 may be embodied in a set of executable program instructions stored on a computer-readable medium, such as one or more disk drives, of a computing system. For example, the computing system 500 shown in FIG. 5 and described in greater detail below can execute a set of executable program instructions to implement the method 400. When the method 400 is initiated, the executable program instructions can be loaded into memory, such as RAM, and executed by one or more processors of the computing system 500. Although the method 400 is described with respect to the computing system 500 shown in FIG. 5, the description is illustrative only and is not intended to be limiting. In some embodiments, the method 400 or portions thereof may be performed serially or in parallel by multiple computing systems.

After the method 400 begins at block 404, the method 400 proceeds to block 408, where a computing system can transform first flow cytometric event data, associated with a first event of a first plurality of events, of a flow cytometric event dataset in a higher-dimensional space to a first transformed flow cytometric event data, associated with the first event, in a first lower-dimensional space. The first event can be associated with a positive subsampling requirement. For example, when subsampling flow cytometric event data comprising the first flow cytometric event data, the subsampled flow cytometric event data may not include the first flow cytometric event data. The first lower-dimensional space can associated with a first plurality of bins. The first transformed flow cytometric event data can be associated with a first bin of the first plurality of bins. The computing system can indicate (e.g., in a data structure) that the first flow cytometric event data should be included when generating a subsampled flow cytometric event data.

In some embodiments, the computing system can receive flow cytometric event data comprising the first flow cytometric event data. The computing system can determine the first flow cytometric event data of the first event of the first plurality of events is associated with the positive subsampling requirement. The computing system can determine the first transformed flow cytometric event data is associated with the first bin of the first plurality of bins.

The processor can be programmed by the executable instructions to: determine a first descriptor of the first transformed flow cytometric event data based on the first bin of the first plurality of bins. The first descriptor of the first transformed flow cytometric event data associated with the first bin can be a first bin number of the first bin of the first plurality of bins. The computing system can: add the first bin, the first descriptor, and/or the first bin number to a memory data structure.

In some embodiments, two bins of the first plurality of bins have an identical size. Each bin of the first plurality of bins can have an identical size. Two bins of the first plurality of bins can have different sizes. Two bins of the first plurality of bins can comprise approximately an identical number of transformed flow cytometric event data. Each of the first plurality of bins can comprise approximately an identical number of transformed flow cytometric event data. The computing system can: determine a size of each of the first plurality of bins. The processor can be programmed by the executable instructions to: determine the size of each of the first plurality of bins based on a plurality of gates. The computing system can: determine the size of each of the first plurality of bins based on the transformed flow cytometric event data associated with a plurality of cells of interest.

In some embodiments, to transform the first flow cytometric event data, the computing system can: transform the first flow cytometric event data using a first dimensionality reduction function. The first dimensionality reduction function can be a linear dimensionality reduction function. The first dimensionality reduction function can be a non-linear dimensionality reduction function. The non-linear dimensionality reduction function can be t-Distributed Stochastic Neighbor Embedding (t-SNE). The computing system can: receive first the dimensionality reduction function, or an identification thereof.

The method 400 proceeds to block 412, where the computing system can transform second flow cytometric event data, associated with second event of the first plurality of events, of the flow cytometric event dataset in the higher-dimensional space to a second transformed flow cytometric event data, associated with the second event, in the first lower-dimensional space. The second event can he associated with the positive subsampling requirement. The second transformed flow cytometric event data can be associated with a second bin of the first plurality of bins. In some embodiments, to transform the second flow cytometric event data, the computing system can: transform the first flow cytometric event data using a second dimensionality reduction function. The first dimensionality reduction function and the second dimensionality reduction function can be identical.

In some embodiments, the computing system can receive flow cytometric event data comprising the second flow cytometric event data. The computing system can determine the second flow cytometric event data of the second event of the first plurality of events is associated with the positive subsampling requirement. The computing system can determine the second transformed flow cytometric event data is associated with the second bin of the first plurality of bins.

The processor can be programmed by the executable instructions to: determine a second descriptor of the second transformed flow cytometric event data based on the second bin of the first plurality of bins. The second descriptor of the second transformed flow cytometric event data associated with the second bin can be a second bin number of the first bin of the first plurality of bins. The computing system can add the second bin, the second descriptor, and/or the second bin number to the memory data structure.

The first flow cytometric event data is associated with a first rare cell and/or the second flow cytometric event data can be associated with a second rare cell. The first rare cell and the second rare cells can be cells of different cell types.

The method 400 proceeds from block 412 to block 416, where the computing system can determine the first bin associated with the first transformed flow cytometric event data and the second bin associated with the second transformed flow cytometric event data are different. The computing system can indicate (e.g., in a data structure) that the second flow cytometric event data should be included when generating a subsampled flow cytometric event data.

In some embodiments, to transform the first flow cytometric event data, the computing system can: transform the first flow cytometric event data to a first transformed flow cytometric event data, associated with the first event, in a second lower-dimensional space, using a second dimensionality reduction function. The second lower-dimensional space can be associated with a second plurality of bins. The first transformed flow cytometric event data in the second lower-dimensional space can be associated with a first bin of the second plurality of bins. To transform the second flow cytometric event data, the computing system can: transform the second flow cytometric event data to a second transformed flow cytometric event data, associated with the second event, in the second lower-dimensional space, using the second dimensionality reduction function. The second transformed flow cytometric event data in the second lower-dimensional space can be associated with a second bin of the second plurality of bins. The first bin of the first plurality of bins can be associated with a first type of cells of interest, the second bin of the second plurality of bins can be associated with a second type of cells of interest, the second bin of the first plurality of bins may not be associated with the first type of cells of interest, the second bin of the first plurality of bins may not be associated with the second type of cells of interest, the first bin of the second plurality of bins may not be associated with the second type of cells of interest, and/or the first bin of the second plurality of bins may not be associated with the first type of cells of interest.

A first combination of the first bin of the first plurality of bins and the first bin of the second plurality of bins can be associated with a first type of cells of interest, and/or a second combination of the second bin of the first plurality of bins and the second bin of the second plurality of bins can be associated with a second type of cells of interest. A first combination of the first bin of the first plurality of bins and the second bin of the second plurality of bins is not associated with the first type of cells of interest and the second type of cells of interest, and/or a second combination of the second bin of the first plurality of bins and the first bin of the second plurality of bins is not associated with the first type of cells of interest and the second type of cells of interest. The computing system can determine the first combination and the second combination are different.

The method 400 proceeds to block 420, where the computing system can generate a subsampled flow cytometric event data, of the flow cytometric event data, comprising the first flow cytometric event data associated with the first vent and the second flow cytometric event data associated with the second event.

In some embodiments, the computing system can: transform third flow cytometric event data, associated with a third event of the first plurality of events, of the flow cytometric event dataset in the higher-dimensional space to a third transformed flow cytometric event data, associated with the third event, in the first lower-dimensional space. The third event can be associated with the positive subsampling requirement. The third transformed flow cytometric event data can be associated with a third bin of the first plurality of bins. The processor can be programmed by the executable instructions to: determine the third bin associated with the third transformed flow cytometric event data is the first bin associated with the first transformed flow cytometric event data or the second bin associated with the second transformed flow cytometric event data. The third flow cytometric event data may not be in the subsampled flow cytometric event data of the flow cytometric event data. The computing system can: determine a third descriptor of the third transformed flow cytometric event data based on the third bin of the first plurality of bins. The third descriptor of the third transformed flow cytometric event data associated with the third bin can be a third bin number of the third bin of the first plurality of bins. The computing system can: determine the third bin, the third descriptor, and/or the third bin number is not in the memory data structure.

In some embodiments, the computing system can: determine fourth flow cytometric event data, associated with a fourth event of the first plurality of events, is associated with a negative subsampling requirement. The computing system can generate the subsampled flow cytometric event dataset, of the flow cytometric event data, comprising the fourth flow cytometric event data associated with the fourth event. The computing system can: receive a plurality of gates defining a plurality of cells of interest. The fourth flow cytometric event data can be associated with a cell of interest of the plurality of cells of interest. The fourth flow cytometric event data can be associated with a sorted cell.

In some embodiments, the computing system can: transform second flow cytometric event data, associated with a second event of a second plurality of events, of the flow cytometric event dataset in the higher-dimensional space to a second transformed flow cytometric event data, associated with the second event of the second plurality of events, in the first lower-dimensional space. The second event of the second plurality of events can be associated with the positive subsampling requirement. The second transformed flow cytometric event data, associated with the second event of the second plurality of events, can be associated with a second bin of the first plurality of bins. The second bin associated with the second transformed flow cytometric event data, associated with the second event of the second plurality of events and the first bin associated with the first transformed flow cytometric event data, associated with the first event of the first plurality of events can be identical. The computing system can: generate the subsampled flow cytometric event dataset, of the flow cytometric event data, comprising the second flow cytometric event data associated with the second event of the second plurality of events.

The computing system can: determine a last event of the first plurality of events is associated with a time parameter or an event number greater than a predetermined threshold. The computing system can: reset the memory data structure. The processor can be programmed by the executable instructions to: add the second bin associated with the second transformed flow cytometric event data, associated with the second event of the second plurality of events, to the memory data structure. In some embodiments, the computing system can: receive a degree of subsampling parameter. The computing system can: determine the predetermined threshold based on the degree of subsampling parameter.

The method 400 ends at block 424.

Execution Environment

Figure 5:
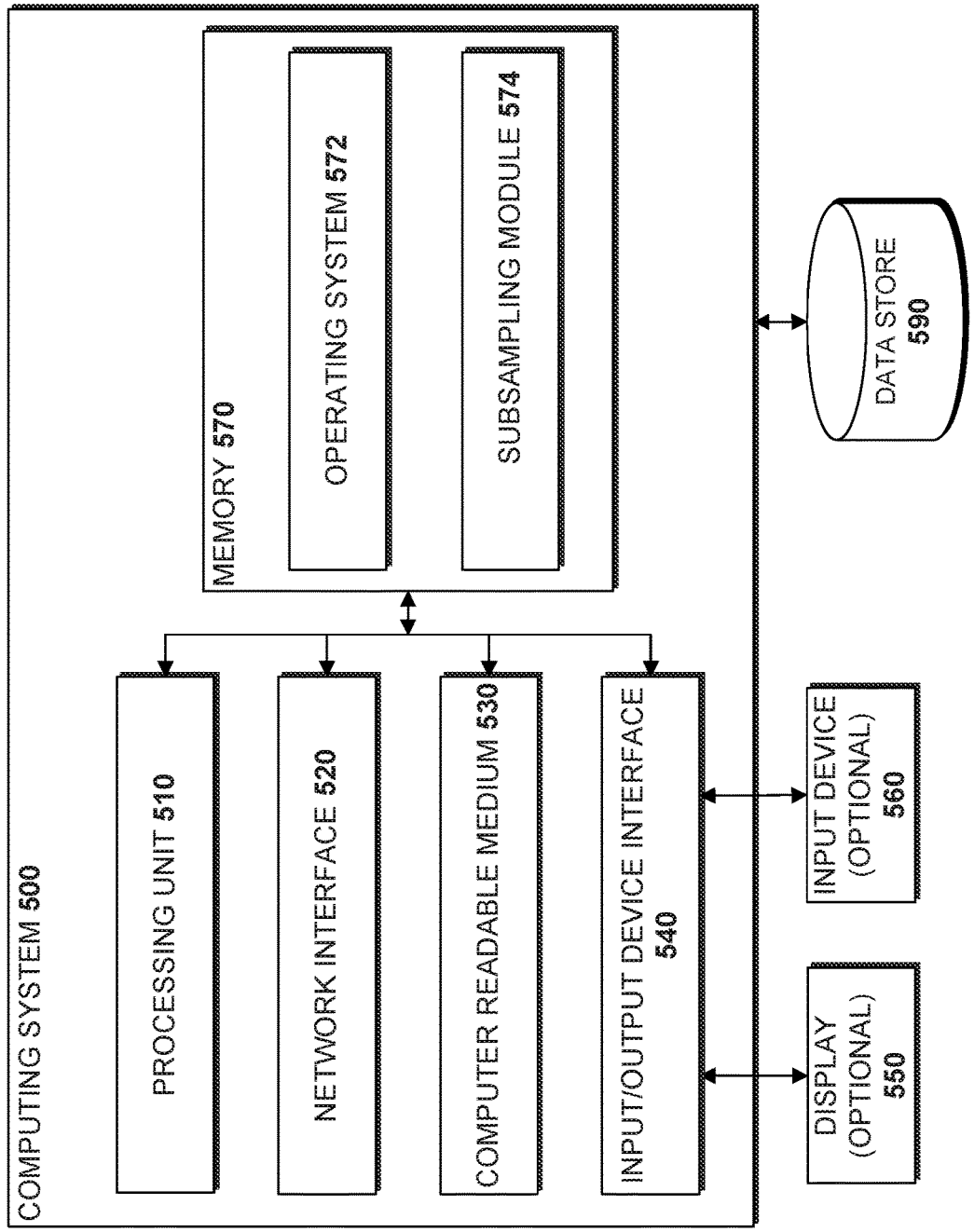
FIG. 5 is a block diagram of an illustrative computing system configured to implement a method of subsampling flow cytometric event data.

In FIG. 5 depicts a general architecture of an example computing device 500 configured to implement the metabolite, annotation and gene integration system disclosed herein. The general architecture of the computing device 500 depicted in FIG. 5 includes an arrangement of computer hardware and software components. The computing device 500 may include many more (or fewer) elements than those shown in FIG. 5. It is not necessary, however, that all of these generally conventional elements be shown in order to provide an enabling disclosure. As illustrated, the computing device 500 includes a processing unit 510, a network interface 520, a computer readable medium drive 530, an input/output device interface 540, a display 550, and an input device 560, all of which may communicate with one another by way of a communication bus. The network interface 520 may provide connectivity to one or more networks or computing systems. The processing unit 510 may thus receive information and instructions from other computing systems or services via a network. The processing unit 510 may also communicate to and from memory 570 and further provide output information for an optional display 550 via the input/output device interface 540. The input/output device interface 540 may also accept input from the optional input device 560, such as a keyboard, mouse, digital pen, microphone, touch screen, gesture recognition system, voice recognition system, gamepad, accelerometer, gyroscope, or other input device.

The memory 570 may contain computer program instructions (grouped as modules or components in some embodiments) that the processing unit 510 executes in order to implement one or more embodiments. The memory 570 generally includes RAM, ROM and/or other persistent, auxiliary or non-transitory computer-readable media. The memory 570 may store an operating system 572 that provides computer program instructions for use by the processing unit 510 in the general administration and operation of the computing device 500. The memory 570 may further include computer program instructions and other information for implementing aspects of the present disclosure.

For example, in one embodiment, the memory 570 includes a subsampling module 574 for subsampling particle analysis event data, such as the subsampling method 400 described with reference to FIG. 4. In addition, memory 570 may include or communicate with the data store 590 and/or one or more other data stores that store flow cytometric event datasets or subsampled flow cytometric event datasets generated.

Terminology

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields, buttons, or other interactive controls for receiving input signals or providing electronic information or for providing information to the user in response to any received input signals. A UI may be implemented in whole or in part using technologies such as hyper-text mark-up language (HTML), JAVASCRIPT™, FLASH™, JAVA™, .NET™, WNDOWS OS™, macOS™, web services, or rich site summary (RSS). In some implementations, a UI may be included in a stand-alone client (for example, thick client, fat client) configured to communicate (e.g., send or receive data) in accordance with one or more of the aspects described.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as specifically programmed event processing computers, wireless communication devices, or integrated circuit devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable medium may be a non-transitory storage medium. The techniques additionally, or alternatively, may be realized at least in part by a computer-readable communication medium that carries or communicates program code in the form of instructions or data structures and that can be accessed, read, and/or executed by a computing device, such as propagated signals or waves.

The program code may be executed by a specifically programmed sort strategy processor, which may include one or more processors, such as one or more digital signal processors (DSPs), configurable microprocessors, an application specific integrated circuits (ASICs), field programmable gate arrays (FPGAs), or other equivalent integrated or discrete logic circuitry. Such a graphics processor may be specially configured to perform any of the techniques described in this disclosure. A combination of computing devices, e.g., a combination of a DSP and a microprocessor, a plurality of microprocessors, one or more microprocessors in conjunction with a DSP core, or any other such configuration in at least partial data connectivity may implement one or more of the features describe. In some aspects, the functionality described herein may be provided within dedicated software modules or hardware modules configured for encoding and decoding, or incorporated in a specialized sorting control card.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended, in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described, in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

While various aspects and embodiments have been disclosed herein, other aspects and embodiments will he apparent to those skilled in the art. The various aspects and embodiments disclosed herein are for purposes of illustration and are not intended to be limiting, with the true scope and spirit being indicated by the following claims.

What is claimed is:

1. A computing system for subsampling flow cytometric event data comprising: non-transitory memory configured to store executable instructions; and
    a processor in communication with the non-transitory memory, the processor programmed by the executable instructions to:
    transform first flow cytometric event data, associated with a first event of a first plurality of events, of a flow cytometric event dataset in a higher-dimensional space to a first transformed flow cytometric event data, associated with the first event, in a first lower-dimensional space, wherein the first event is associated with a positive subsampling requirement, wherein the first lower-dimensional space is associated with a first plurality of bins, and wherein the first transformed flow cytometric event data is associated with a first bin of the first plurality of bins;
    transform second flow cytometric event data, associated with a second event of the first plurality of events, in the higher-dimensional space to a second transformed flow cytometric event data, associated with the second event, of the flow cytometric event dataset in the first lower-dimensional space, wherein the second event is associated with the positive subsampling requirement, and wherein the second transformed flow cytometric event data is associated with a second bin of the first plurality of bins;
    determine the first bin associated with the first transformed flow cytometric event data and the second bin associated with the second transformed flow cytometric event data are different; and
    generate the subsampled flow cytometric event dataset, of the flow cytometric event data, comprising the first flow cytometric event data associated with the first event and the second flow cytometric event data associated with the second event.

2. The system of claim 1, wherein the processor is programmed by the executable instructions to: receive flow cytometric event data comprising the first flow cytometric event data and the second flow cytometric event data.

3. The system of claim 1, wherein the processor is programmed by the executable instructions to:
    determine the first flow cytometric event data of the first event of the first plurality of events is associated with the positive subsampling requirement; and
    determine the second flow cytometric event data of the second event of the first plurality of events is associated with the positive subsampling requirement.

4. The system of claim 1, wherein the processor is programmed by the executable instructions to:
    determine the first transformed flow cytometric event data is associated with the first bin of the first plurality of bins; and
    determine the second transformed flow cytometric event data is associated with the second bin of the first plurality of bins.

5. The system of claim 1, wherein the processor is programmed by the executable instructions to:
    determine a first descriptor of the first transformed flow cytometric event data based on the first bin of the first plurality of bins; and
    determine a second descriptor of the second transformed flow cytometric event data based on the second bin of the first plurality of bins.

6. The system of claim 5, wherein the first descriptor of the first transformed flow cytometric event data associated with the first bin is a first bin number of the first bin of the first plurality of bins, and wherein the second descriptor of the second transformed flow cytometric event data associated with the second bin is a second bin number of the first bin of the first plurality of bins.

7. The system of claim 1, wherein the first flow cytometric event data is associated with a first rare cell and/or the second flow cytometric event data is associated with a second rare cell, optionally wherein the first rare cell and the second rare cells are cells of different cell types.

8. The system of claim 1, wherein the processor is programmed by the executable instructions to:
    add the first bin, a first descriptor, and/or a first bin number to a memory data structure; and add the second bin, a second descriptor, and/or a second bin number to the memory data structure.

9. The system of claim 1, wherein the processor is programmed by the executable instructions to:
   transform third flow cytometric event data, associated with a third event of the first plurality of events, of the flow cytometric event dataset in the higher-dimensional space to a third transformed flow cytometric event data, associated with the third event, in the first lower-dimensional space, wherein the third event is associated with the positive subsampling requirement, and wherein the third transformed flow cytometric event data is associated with a third bin of the first plurality of bins; and
   determine the third bin associated with the third transformed flow cytometric event data is the first bin associated with the first transformed flow cytometric event data or the second bin associated with the second transformed flow cytometric event data,
   wherein the third flow cytometric event data is not in the subsampled flow cytometric event data of the flow cytometric event data.

10. The system of claim 9, wherein the processor is programmed by the executable instructions to: determine a third descriptor of the third transformed flow cytometric event data based on the third bin of the first plurality of bins, wherein the third descriptor of the third transformed flow cytometric event data associated with the third bin third bin number of the third bin of the first plurality of bins.

11. The system of claim 9, wherein the processor is programmed by the executable instructions to: determine the third bin, a third descriptor, and/or a third bin number is not in a memory data structure.

12. The system of claim 11, wherein the processor is programmed by the executable instructions to:
   determine fourth flow cytometric event data, associated with a fourth event of the first plurality of events, is associated with a negative subsampling requirement,
   wherein to generate the subsampled flow cytometric event dataset, the processor is programmed by the executable instructions to: generate the subsampled flow cytometric event dataset, of the flow cytometric event data, comprising the fourth flow cyometric event data associated with the fourth event.

13. The system of claim 12, wherein the processor is programmed by the executable instructions to:
   receive a plurality of gates defining a plurality of cells of interest, wherein fourth flow cytometric event data is associated with a cell of interest of the plurality of cells of interest.

14. The system of claim 13, wherein the fourth flow metric event data is associated with a sorted cell.

15. The system of claim 1, wherein the processor is programmed by the executable instructions to:
   transform second flow cytometric event data, associated with a second event of a second plurality of events, of the flow cytometric event dataset in the higher-dimensional space to a second transformed flow cytometric event data, associated with the second event of the second plurality of events, in the first lower-dimensional space, wherein the
   second event of the second plurality of events is associated with the positive subsampling requirement, wherein the second transformed flow cytometric event data, associated with the second event of the second plurality of events, is associated with the second bin of the first plurality of bins, wherein the second bin associated with the second transformed flow cytometric event data, associated with the second event of the second plurality of events and the first bin associated with the first transformed flow cytometric event data, associated with the first event of the first plurality of events are identical,
   wherein to generate the subsampled flow cytometric event dataset, the processor is programmed by the executable instructions to: generate the subsampled flow cytometric event dataset, of the flow cytometric event data, comprising the second flow cytometric event data associated with the second event of the second plurality of events.

16. The system of claim 15, wherein the processor is programmed by the executable instructions to:
   determine a last event of the first plurality of events is associated with a time parameter or an event number greater than a predetermined threshold;
   reset a memory data structure; and
   add the second bin associated with the second transformed flow cytometric event data, associated with the second event of the second plurality of events, to the a memory data structure.

17. The system of claim 16, wherein the processor is programmed by the executable instructions to:
   receive a degree of subsampling parameter; and
   determine the predetermined threshold based on the degree of subsampling parameter.

18. The system of claim 1,
   wherein to transform the first flow cytometric event data, the processor is programmed by the executable instructions to: transform the first flow cytometric event data using a first dimensionality reduction function, and/or
   wherein to transform the second flow cytometric event data, the processor is programmed by the executable instructions to: transform the second flow cytometric event data using a second dimensionality reduction function.

19. The system of claim 18, wherein the first dimensionality reduction function and/or the second dimensionality reduction function is a linear dimensionality reduction function.

20. The system of claim 18, wherein the first dimensionality reduction function and/or the second dimensionality reduction function is a non-linear dimensionality reduction function.

* * * * *